United States Patent [19]

Kawanishi

[11] Patent Number: 5,894,111
[45] Date of Patent: Apr. 13, 1999

[54] QUANTITATIVE CHARGING APPARATUS

[75] Inventor: Shozo Kawanishi, Nishinomiya, Japan

[73] Assignee: Yamato Scale Co., Ltd., Hyogo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/611,031

[22] Filed: Mar. 5, 1996

[30] Foreign Application Priority Data

Mar. 6, 1995 [JP] Japan .................. 7-045539

[51] Int. Cl.$^6$ ............................................. G01G 13/00
[52] U.S. Cl. ............................................. 177/25.18
[58] Field of Search ................................... 177/25.18

[56] References Cited

U.S. PATENT DOCUMENTS

| | | | |
|---|---|---|---|
| 4,100,984 | 7/1978 | Klopfenstein et al. | 177/50 |
| 4,494,619 | 1/1985 | Matsuno | 177/25.18 |
| 4,534,430 | 8/1985 | Steel | 177/25.18 |
| 4,560,015 | 12/1985 | Minamida | 177/25.18 |
| 4,813,503 | 3/1989 | Douglas et al. | 177/25.18 |
| 4,828,054 | 5/1989 | Mosher | 177/25.18 |
| 4,874,048 | 10/1989 | Kawanishi et al. | 177/25.18 |

FOREIGN PATENT DOCUMENTS

| | | | |
|---|---|---|---|
| 1 230 580 | 12/1966 | Germany | 42/27 |
| 50-120660 | 9/1975 | Japan | |
| 62-9226 | 1/1987 | Japan | |
| 608 886 | 1/1979 | Switzerland | G01G 13/04 |
| 2 065 900 | 7/1981 | United Kingdom | G01G 13/04 |
| 2 220 757 | 1/1990 | United Kingdom | G01G 13/00 |

*Primary Examiner*—Randy W. Gibson
*Attorney, Agent, or Firm*—Senniger, Powers, Leavitt & Roedel

[57] ABSTRACT

An apparatus for quantitative charging of a high accuracy and a large weighing speed are disclosed. A storage cup, which is formed by a main storage cup and four subtractive storage cups, and four additive storage cups are disposed. The storage cup stores articles having a weight which is close to a target weight. A capacity ratio between the subtractive storage cups and a capacity ratio between the additive storage cups are both set 1:2:4:8. Articles are supplied from a charging apparatus into the storage cup and the four additive storage cups. The articles within the storage cup are weighed by a load cell as a rough charging weight, and a weight difference between the rough charging weight and the target weight is calculated. A proper combination of the additive storage cups or the subtractive storage cups is selected in accordance with the weight difference, and the articles are discharged from these cups together with the articles which are stored within the main storage cup through a chute into a container or a packing machine.

22 Claims, 6 Drawing Sheets

QUANTITATIVE CHARGING APPARATUS

FIELD OF THE INVENTION

The present invention relates to a quantitative charging apparatus for filling with articles to a target weight at a high accuracy and at a high speed, in which the articles are dividedly stored in advance in a main storage cup of a predetermined capacity and subtractive storage cups each having a predetermined capacity so that the articles can be removed later if the articles are overweighed, and articles for adding stored in additive storage cups each having a predetermined capacity so that the articles can be added later if there is an underweight.

PRIOR ART

Figure 7:
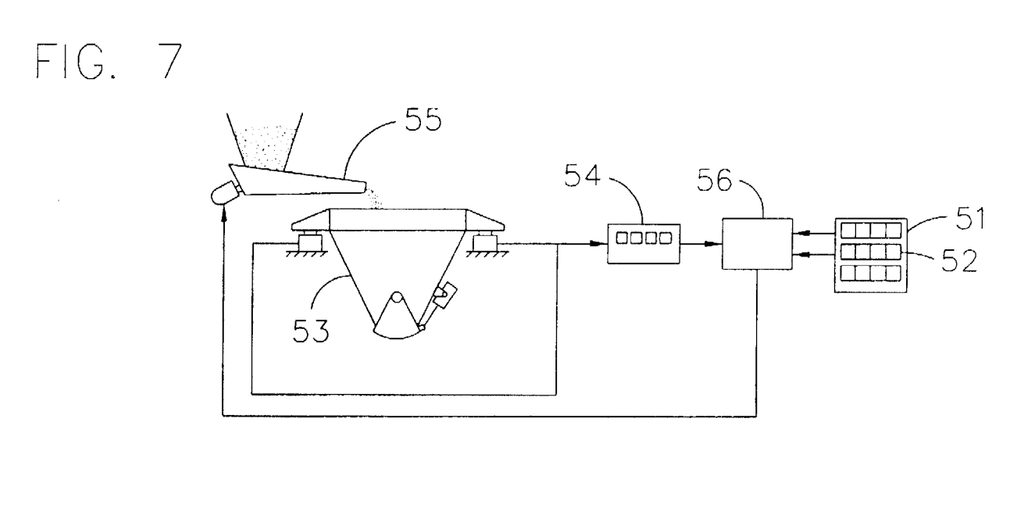
FIG. 7 is a schematic representation showing a conventional quantitative charging apparatus which has a vibrational feeder.
Figure 8:
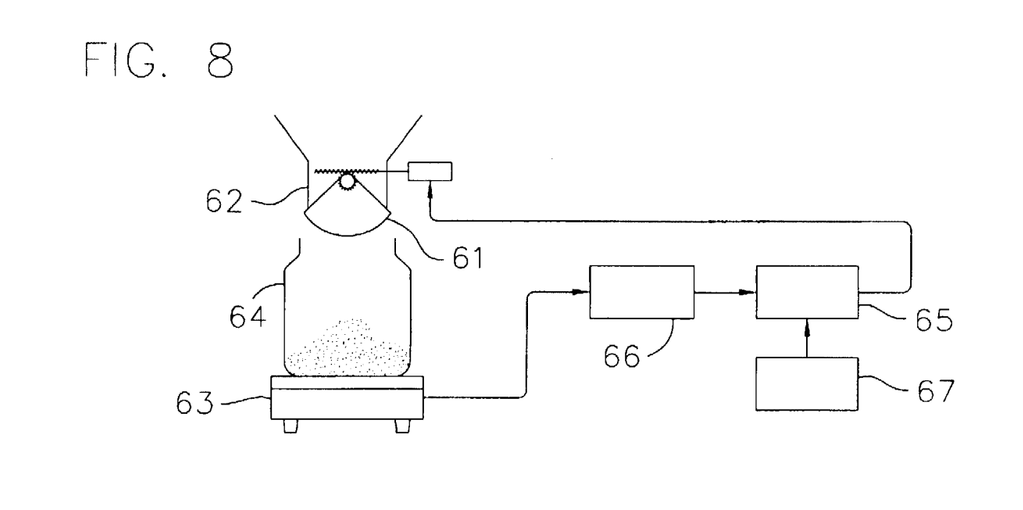
FIG. 8 is a schematic representation showing a conventional quantitative charging apparatus which has a flow rate control gate.
Figure 9:
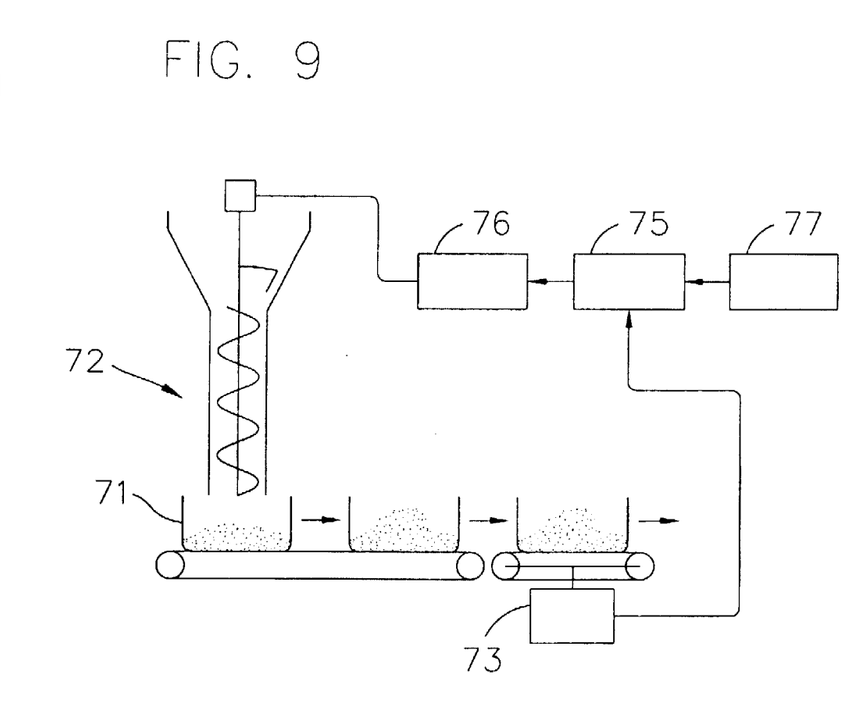
FIG. 9 is a schematic representation showing a conventional quantitative charging apparatus which has a auger screw.

Quantitative charging of powdery or granular articles has a long tradition. Of constant quantity filling methods, volumetric weighing (weight determined by volume) is a method which has been widely adopted. However, volumetric weighing has been gradually replaced with weighing by weight. This is mainly because it has become necessary to weigh more accurately, typically a chemical compound, for example. This is a problem which has not been very important for weighing of agricultural products such as rice and wheat, in the past. FIGS. 7 to 9 show a typical example of a quantitative charging apparatus for charging with a granular material such as powder in a current manner.

In the quantitative charging apparatus of FIG. 7, a target weight is set by a 100% setter 51, 90% of the target weight is set as a cut value by a cut value setter 52, and articles are supplied while feeding the articles to a weighing hopper 53. How large the cut value should be depends on the nature of the articles which are to be measured. Charging with the articles are started in the state wherein the weighing hopper 53 is empty and an indicator 54 indicates 0. To shorten a weighing time as much as possible, it is necessary to perform charging with an increased feeding rate which is realized by increasing the amplitude of a feeder 55 up to 90% to deliver a predetermined quantity. This is called "large quantity bulk charging," "rough charging" or "90% charging." When a charged quantity reaches about 90%, the amplitude of the feeder 55 is decreased under the control of a control apparatus 56, fine charging for the remaining 10% is then performed, and charging is stopped when charging is completed up to 100%. Such fine charging is called "small quantity dribble charging." Upon completion of charging, a container (not shown) is filled with the articles which are supplied from a lower portion of the weighing hopper 53.

This completes one cycle of quantitative filling. In reality, however, to increase a weighing accuracy, gap correction is performed. Gap correction is attained considering articles which are falling and in transit to weighing hopper 53 from the feeder 55 shown in FIG. 7, that is, by subtracting the falling articles in advance. While FIG. 7 shows an example where large quantity charging and small quantity charging are realized by changing the amplitude of one feeder 55, in another type of apparatus, two feeders 55, one for large quantity charging and the other for small quantity charging, are switched with each other. In addition to vibration feeders, screw feeders (or known as auger type feeders) are also known as the feeders 55.

Alternatively, as shown in FIG. 8, there is an another type of quantitative charging apparatus in which a hopper 62 having a flow rate control gate 61 for charging is provided, an empty container 64 is placed on a plate of a scale 63, and the container 64 is charged with articles while controlling opening and closing of the flow rate control gate 61 of the hopper 62. In this quantitative charging apparatus, a target weight is set in a control apparatus 65 by a setter 67, and a weight value is indicated by an indicator 66. In this type of quantitative charging apparatus, by controlling opening and closing of the flow rate control gate 61, large quantity charging and small quantity charging are successively adjusted.

Further, a quantitative charging apparatus having a structure as that shown in FIG. 9 is also known. In this apparatus, a container 71 is charged with articles by an auger screw 72, up to a volume which is set in a setter 77 in advance. When the container 71 is weighed on a weighing apparatus 73, the weight of the content of the container 71 is indicated by an indicator 75. This value is fed back to a control apparatus 76 as a charged quantity, and is controlled to be close to a predetermined quantity during filling up of a next container. Thus, this apparatus examines whether the charging value of a precedent container which is weighed by the weighing apparatus 73 coincides with a target weight, and repeats controlling so that a charging value which is closer to the target weight is attained during filling up of a next container. The accuracy of such a quantitative charging apparatus is not very good in general, since speed control is executed by the auger screw. In a further alternative apparatus, two auger screws, one for large quantity charging and the other for small quantity charging, are provided, charging is performed with the auger screw for large quantity charging at a rough volume charging up to 0% to 90%, a container is moved onto a scale by a conveyer upon completion of large quantity charging, and articles are supplied by small quantity charging up to a predetermined quantity while weighing. Such an apparatus is complex, and is often expensive.

The conventional quantitative charging apparatuses shown in FIGS. 7 to 9 are each a constant unit scale which performs weighing while charging. The biggest problem in weighing while charging is that if articles are excessively charged over a target weight by mistake, weighing failure occurs. Hence, in these apparatuses, it is essential to stop charging once before a target weight is reached and to continue charging after setting the feeding rate to a smaller rate so that the target weight is not exceeded. This is a cause of a decrease in the charging speed of the quantitative charging apparatus.

Further, in the quantitative charging apparatuses shown in FIGS. 7 and 8, since the charging speed is controlled by a value which is found during weighing, the charging speed per a unit time is limited so as to perform filling at a high accuracy. In addition, since large quantity charging and small quantity charging are switched by means of the same feeder or the like, due to the existence of articles which are being dropped during switching, it is not possible to set a ratio of feed quantities larger than 95:5 between large quantity charging and small quantity charging per unit time.

The present invention solves these problems associated with the conventional techniques. An object of the present invention is to provide for a method of and an apparatus for quantitative charging of a high accuracy and a large weighing speed.

SUMMARY OF THE INVENTION

A quantitative charging apparatus according to the present invention, comprises: a storage cup which includes one main storage cup of a predetermined capacity and a plurality of subtractive storage cups each of a predetermined capacity so as to store articles having a weight which is close to a target weight $W_o$ within said main storage cup and said subtractive storage cups; a plurality of additive storage cups each of a predetermined capacity so as to store articles for adding; weighing means for weighing the total weight of articles which are supplied into said main storage cup and each of said subtractive storage cups as a rough charging weight $W_a$; and control means for comparing said target weight $W_o$ and said rough charging weight $W_a$. When rough charging weight $W_a$ is smaller than said target weight $W_o$, said control means calculates an underweight $W_b=W_o-W_a$, selects a combination of said additive storage cups based on the weight of articles stored in each of said additive storage cups which is calculated from the bulk specific gravity of the articles so that the combination becomes closest to said underweight $W_b$, and thereafter discharges the articles stored within said additive storage cups which are selected together with the articles which are stored in said storage cup. When said rough charging weight $W_a$ is larger than said target weight $W_o$, said control means calculates an overweight $W_c=W_a-W_o$, selects a combination of said subtractive storage cups based on the weight of articles stored in each of said subtractive storage cups which is calculated from the bulk specific gravity of the articles so that the combination becomes closest said overweight $W_c$, and thereafter discharges the articles stored within said subtractive storage cups which are not selected together with the articles stored in said main storage cup.

In another embodiment of the present invention, a quantitative charging apparatus comprises: a storage cup which includes one main storage cup of a predetermined capacity and one or a plurality of subtractive storage cups each of a predetermined capacity so as to store articles having a weight which is close to a target weight $W_o$ within said main storage cup and said subtractive storage cups; a plurality of additive storage cups each of a predetermined capacity so as to store articles for adding; weighing means for weighing the total weight of articles which are supplied into said main storage cup and each of said subtractive storage cups as a rough charging weight $W_a$; and control means for calculating a weight difference $W_d=W_a-W_o$ between said target weight $W_o$ and said rough charging weight $W_a$, selecting said subtractive storage cups to be subtracted from said weight difference $W_d$ and said additive storage cups to be added to said weight difference $W_d$ based on the weight of articles stored in each of said subtractive storage cups and said additive storage cups which is calculated from the bulk specific gravity of the articles so that the combination becomes closest said weight difference $W_d$, and thereafter discharging the articles stored within said subtractive storage cups which are not selected and the articles stored within said additive storage cups which are selected together with the articles stored in said main storage cup.

In a quantitative charging apparatus according to the present invention, a storage cup is provided which includes one main storage cup of a predetermined capacity and a plurality of subtractive storage cups each of a predetermined capacity. Articles having a weight which is close to a target weight $W_o$ are dividedly stored in the main storage cup and the subtractive storage cups, to attain the target weight $W_o$. Further, there is a plurality of additive storage cups for each storing articles for adding. The total weight of the articles within the main storage cup and a plurality of subtractive storage cups are weighed by weighing means, as a rough charging weight $W_a$.

Control means compares the target weight $W_o$ with the rough charging weight $W_a$. When the rough charging weight $W_a$ is smaller than the target weight $W_o$ as a result of the comparison, an underweight $W_b=W_o-W_a$ is calculated. A combination of the additive storage cups which makes up a weight which is closest the underweight $W_b$ is selected. The articles within the additive storage cups which are selected are discharged together with the articles which are stored in said main storage cup and all subtractive storage cups.

Further, when the rough charging weight $W_a$ is larger than said target weight $W_o$, an overweight $W_c=W_a-W_o$ is calculated. A combination of the subtractive storage cups which makes up a weight which is closest the overweight $W_c$ is selected, based on the weights of the articles which are stored in the subtractive storage cups. The articles within the subtractive storage cups which are not selected are discharged together with the articles which are stored in said main storage cup.

The weight of each subtractive storage cup and the weight of each additive storage cup can be calculated from the bulk specific gravity of the articles. The value of the bulk specific gravity may be calculated from the capacities of said main storage cup and all subtractive storage cups each time the rough charging weight $W_a$ is weighed, or may be fixed based on a value which is predicted in advance.

In an another type of quantitative charging apparatus according to the present invention, a storage cup is provided which includes one main storage cup of a predetermined capacity and one or a plurality of subtractive storage cups each of a predetermined capacity. As in the first structure described above, articles for adding are stored in the plurality of additive storage cups each having a predetermined capacity. The total weight of the articles within the main storage cup and the subtractive storage cups are weighed by weighing means, as the rough charging weight $W_a$.

The control means calculates a weight difference $W_d=W_a-W_o$ between said target weight $W_o$ and said rough charging weight $W_a$. A combination of said subtractive storage cups to be subtracted from said weight difference $W_d$ and said additive storage cups to be added to said weight difference $W_d$ is selected so that the weight difference $W_d$ becomes as close to 0 as possible.

The articles within said subtractive storage cups which are not included in this combination and the articles within said additive storage cups which are included in this combination are discharged together with the articles which are stored in said main storage cup. As in the previously described embodiment of the invention, the weight of each subtractive storage cup and the weight of each additive storage cup can be calculated from the bulk specific gravity of the articles.

In the quantitative charging apparatuses of the two embodiments described above, since quantitative charging is attained by performing weighing only once, the charging speed is large. Further, since the combination of said subtractive storage cups for subtraction or the combination of said additive storage cups for addition is calculated by a computer or the like in a moment, the filling speed is further higher.

In the both structures described above, some of said subtractive storage cups may have the same capacity. Further, a capacity ratio between n subtractive storage cups ($n \leq$ the number of said subtractive storage cups) may satisfy the following formula:

$$1 : r^1 : r^2 : \ldots : r^{k-1} : \ldots : r^{n-1} \qquad (3)$$

where r is a positive real number, and $0 < k \leq n$.

In the formula (3), r may be an integer or a decimal number as far as having a positive value. If r=2, the capacity ratio between the subtractive storage cups is 1:2:4:8:16 . . . , which makes it possible to adjust weights finer in a wide range. Meanwhile, if r=3, the capacity ratio between the subtractive storage cups is 1:3:9:27 . . . , which makes it possible to adjust weights in an even wider range.

In the both embodiments described above, some of said additive storage cups may have the same capacity. Further, a capacity ratio between at least m additive storage cups (m≦the number of said additive storage cups) may satisfy the following formula:

$$1:s^1:s^2: \ldots :s^{k-1}: \ldots :s^{r-1} \qquad (4)$$

where s is a positive real number, and $0<k \leq m$.

In the formula (4), s may be an integer or a decimal number as far as having a positive value. If s=2, the capacity ratio between the additive storage cups is 1:2:4:8:16 . . . , which makes it possible to adjust weights finer in a wide range. Meanwhile, if s=3, the capacity ratio between the additive storage cups is 1:3:9:27 . . . , which makes it possible to adjust weights in an even wider range.

In a quantitative charging apparatus according to the present invention, to make up a target weight, articles are divided and stored in advance in a main storage cup and a subtractive storage cup while a plurality of additive storage cups are prepared to store articles for adding in advance. Hence, only by selecting a subtractive storage cup and an additive storage cup for supplying in accordance with a weight difference between a rough charging weight and the target weight, it is possible to fill up with the articles having the target weight. Therefore, weighing may be performed only once, which increases the speed of quantitative charging very largely. Further, since a combination of the subtractive storage cups and the additive storage cups is calculated by a computer or the like in a moment, the filling speed is further increased.

DETAILED DESCRIPTION OF THE PREFERRED EMBODIMENTS

Examples of the present invention will be described in detail with reference to drawings.

(Example 1)

Figure 1:
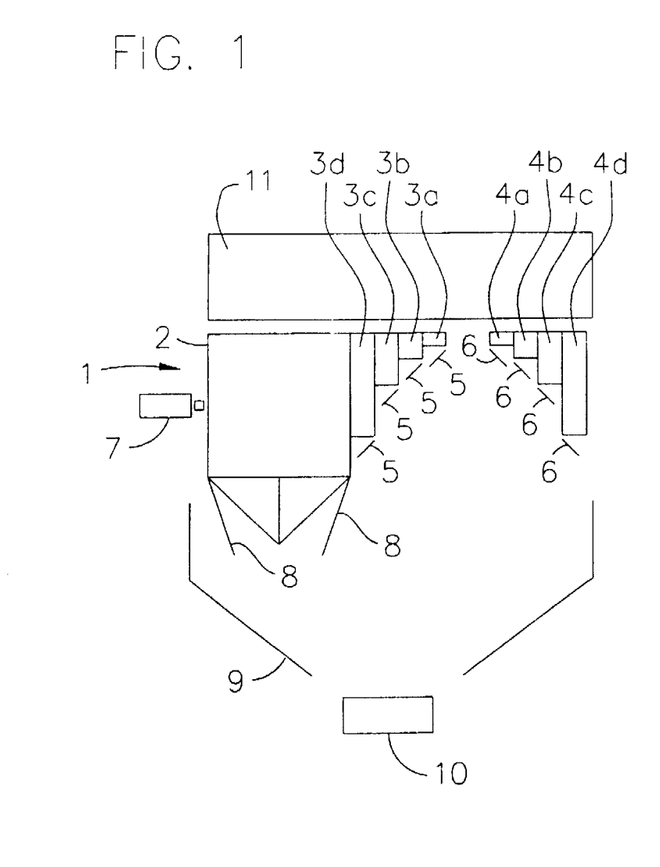
FIG. 1 is a schematic representation showing a first example of a quantitative charging apparatus according to the present invention.

FIG. 1 shows a schematic structure of a quantitative charging apparatus according to example 1 of the present invention. The quantitative charging apparatus according to the present example is used to fill a predetermined container such as a box and a bag or a packing machine, with articles having a target weight $W_o$, and comprises a storage cup 1 and four additive storage cups 4a, 4b, 4c and 4d for storing the articles. The storage cup 1 is formed by a main storage cup 2 and four subtractive storage cups 3a, 3b, 3c and 3d. The subtractive storage cups 3a to 3d each have a capacity which is the same as that of each of the additive storage cups 4a to 4d. The articles are supplied from an charging apparatus 11 into the storage cup 1 and the four additive storage cups 4a to 4d.

The storage cup 1 has a load cell 7 so that it is possible to weigh the total weight of the articles which are supplied into the main storage cup 2 and the four subtractive storage cups 3a to 3d. The four additive storage cups 4a to 4d do not have a load cell. A weight value at the load cell 7 is supplied to a control apparatus (not shown).

A gate 8 for discharging the articles is disposed in a bottom portion of the main storage cup 2, while four gates 5 which open and close independently of each other are provided for the four subtractive storage cups 3a to 3d, respectively. Further, four gates 6 which open and close independently of each other are provided for the four additive storage cups 4a to 4d, respectively. The articles within the storage cup 1 and the additive storage cups 4a to 4d are discharged into a container 10 such as a box and a bag or a packing machine, through a chute 9. The gate 8, the four gates 5 and the four gates 6 are opened and closed under the control of the afore-mentioned control apparatus (not shown).

A capacity ratio between the subtractive storage cups 3a to 3d is a ratio which is obtained by setting r=2 and k=4 in a formula $r^{k-1}$ (r is a positive real number, $k \leq n$, n=the number of the subtractive storage cups), that is, 1:2:4:8. Further, a capacity ratio between the additive storage cups 4a to 4d is a ratio which is obtained by setting s=2 and k=4 in a formula $s^{k-1}$ (s is a positive real number, $k \leq m$, m=the number of the additive storage cups), that is, 1:2:4:8.

Figure 2:
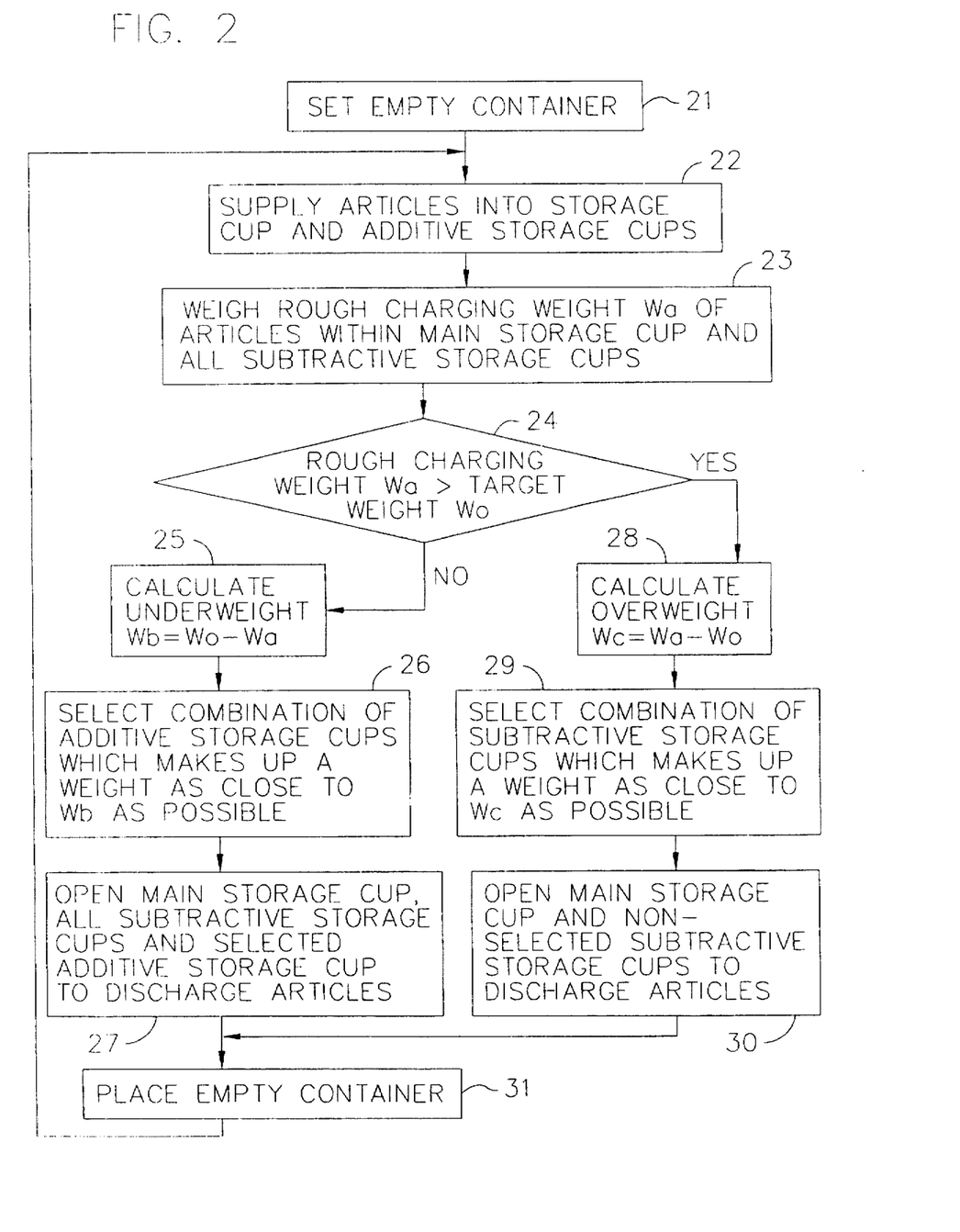
FIG. 2 is a flow chart showing the quantitative charging method which is performed by using the quantitative charging apparatus in FIG. 1.

The quantitative charging method using the quantitative charging apparatus according to the present example will be described with reference to the flow chart in FIG. 2. First, at a step 21 shown in FIG. 2, the container 10 is set in a lower portion of the chute 9. Next, at a step 22, the articles are supplied from the charging apparatus 11 into the main storage cup 2 and the four subtractive storage cups 3a to 3d which form the storage cup 1, and into the four additive storage cups 4a to 4d. The main storage cup 2 and the four subtractive storage cups 3a to 3d which form the storage cup 1 have almost the same capacity as that of the articles having the target weight $W_o$. Hence, the articles of a predetermined capacity which has a weight close to the target weight $W_o$ is supplied into the storage cup 1.

At a step 23, the total weight of the articles which are supplied into the storage cup 1, i.e., the main storage cup 2 and the four subtractive storage cups 3a to 3d are weighed by the load cell 7, as a rough charging weight $W_a$. The weights of the articles which are supplied into the additive storage cups 4a to 4d are not weighed.

Next, at a step 24, the rough charging weight $W_a$ and the target weight $W_o$ are compared with each other. The comparison is performed in the control apparatus. The following procedure is performed in accordance with a result of the comparison. First, when the rough charging weight $W_a$ is smaller than the target weight $W_o$, an underweight $W_b=W_o-W_a$ is calculated in the control apparatus. Next, a combination of the additive storage cups 4a to 4d is selected so that the combination becomes closest the underweight $W_b$.

The weights of the articles which are stored in the additive storage cups 4a to 4d are calculated by multiplying the bulk specific gravity of the articles by the capacities of the additive storage cups 4a to 4d. Alternatively, the bulk specific gravity of the articles may be calculated from the total capacity of the main storage cup 2 and all subtractive storage cups 3a to 3d each time the rough charging weight $W_a$ is weighed, or may be a fixed value which is determined based on a value which is predicted in advance.

Since the capacity ratio between the additive storage cups 4a to 4d is 1:2:4:8, when these additive storage cups are combined, this means that the articles for adding are prepared which have a weight 1 to 15 times as large as that of the articles which are stored in the smallest additive storage cup 4a. Of these combinations, a combination of the additive storage cups which makes up a weight which is closest to the underweight $W_b$ is selected. Further, at a step 27, the articles within these additive storage cups which are selected are discharged together with the articles within the main storage cup 2 and the subtractive storage cups 3a to 3d. Discharging of the articles is attained by opening and closing of the gates 8 and 6 under the control of the control apparatus.

On the other hand, when the rough charging weight $W_a$ is larger than the target weight $W_o$, an overweight $W_c=W_a-W_o$ is calculated in the control apparatus. Next, a combination of the subtractive storage cups 3a to 3d is selected so that the combination becomes closest the overweight $W_c$. The weights of the articles within the subtractive storage cups 3a to 3d are calculated in a similar manner as in the case of the additive storage cups 4a to 4d described above.

Since the capacity ratio between the subtractive storage cups 3a to 3d is 1:2:4:8, these subtractive storage cups can be combined to provide weights 1 to 15 times as large as the weight of the articles stored in the smallest subtractive storage cup 3a. Of these combinations, a combination of the subtractive storage cups which makes up a weight which is closest to the overweight $W_c$ is selected. Further, at a step 30, the articles within the subtractive storage cups except for the selected subtractive storage cups are discharged together with the articles within the main storage cup 2. Discharging of the articles is attained by opening and closing of the gates 8 and 5 under the control of the control apparatus.

Further, a filled container is replaced with an empty container at a step 31, and weighing is repeated from the step 22.

In the quantitative charging apparatus according to the present example, since the additive storage cups contain combinations of weights 1 to 15 times as large as that of the articles stored in the additive storage cup 4a, and since the subtractive storage cups contain combinations of weights 1 to 15 times as large as that of the articles stored in the subtractive storage cup 3a, it is possible to adjust a weight within a large range which is defined by multiplying the articles stored in the subtractive storage cup 3a or the additive storage cup 4a by successive integers of −15 to 15, from the weight of the articles stored in the main storage cup 2. Further, weighing is performed only once when the rough charging weight $W_a$ is calculated, and weighing while charging the articles is not performed. Hence, in the quantitative charging apparatus according to the present example, the charging speed is very high. In addition, since there is only one load cell, the quantitative charging apparatus is advantageous in terms of cost.

(Example 2)

Figure 3:
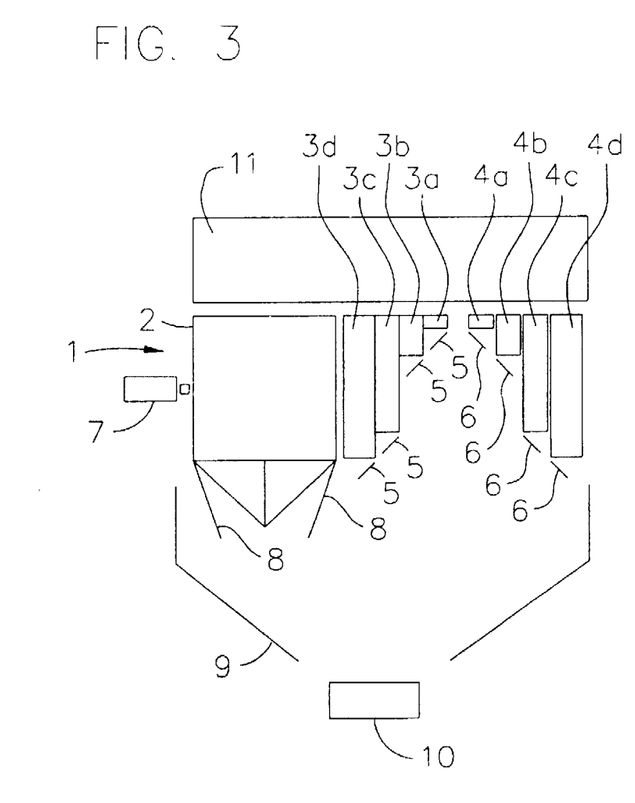
FIG. 3 is a schematic representation showing a second example of a quantitative charging apparatus according to the present invention.

FIG. 3 shows a schematic structure of a quantitative charging apparatus according to a example 2 of the present invention. The quantitative charging apparatus according to the present example 2 has structure similar to that of the example 1 in FIG. 1 described above, and identical reference symbol are assigned to corresponding elements. The quantitative charging apparatus according to the present example 2 is different from the apparatus according to the example 1 described above, in that a capacity ratio between the subtractive storage cups 3a to 3d is obtained by setting r=3 in a formula $r^{k-1}$ (r is a positive real number, k≦n, n=the number of the subtractive storage cups), that is, 1:3:9:27 and in that a capacity ratio between the additive storage cups 4a to 4d is obtained by setting s=3 in a formula $s^{k-1}$ (s is a positive real number, k≦m, m=the number of the additive storage cups), that is, 1:3:9:27.

Figure 4:
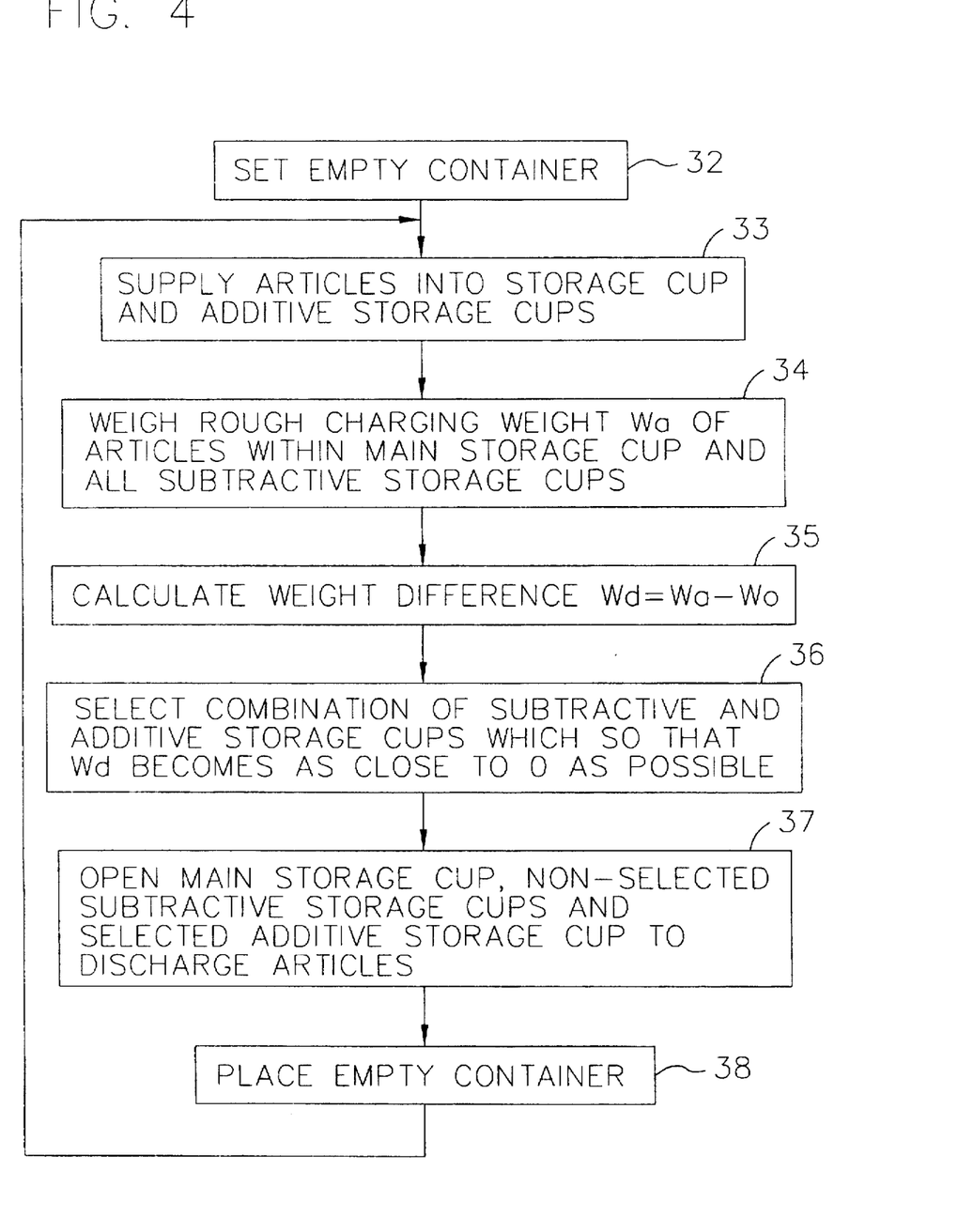
FIG. 4 is a flow chart showing the quantitative charging method which is performed by using the quantitative charging apparatus in FIG. 3.

Now, a quantitative charging method using the apparatus according to the present example 2 will be described with reference to the flow chart in FIG. 4. First, as in the example 1, the container 10 is set in a lower portion of the chute 9 at a step 32. At a step 33, the articles are supplied from the charging apparatus 11 into the main storage cup 2 and the four subtractive storage cups 3a to 3d of the storage cup 1, and into the four additive storage cups 4a to 4d. At a step 34, the total weight of the articles which are supplied into the storage cup 1, i.e., the main storage cup 2 and the four subtractive storage cups 3a to 3d, are weighed by the load cell 7, as the rough charging weight $W_a$. As in the example 1, the weights of the articles which are supplied into the additive storage cups 4a to 4d are not weighed.

Next, at a step 35, a weight difference $W_d=W_a-W_o$ is calculated. At a step 36, a combination of the subtractive storage cup to be subtracted from the weight difference $W_d$ and the additive storage cups to be added to the weight difference $W_d$ is selected so that the weight difference $W_d$ becomes as close to 0 as possible. At a step 37, the articles of the subtractive storage cups which are not included in this combination and the articles of the additive storage cups which are included in this combination are discharged, together with the articles stored within the main storage cup 2.

The weights of the articles which are stored within the subtractive storage cups 3a to 3d and the additive storage cups 4a to 4d are calculated based on the bulk specific gravity of the articles, as in the example 1.

Since the capacity ratio between the subtractive storage cups 3a to 3d and the capacity ratio between the additive storage cups 4a to 4d is each 1:3:9:27 in this example, the additive storage cups contain combinations of weights 1 to 40 times as large as that of the articles which are stored in the subtractive storage cup 3a or the additive storage cup 4a (hereinafter "minimum weight unit"), and the subtractive storage cups contain combinations of 1–40 minimum weight units. For instance, when the articles having a weight 7 times as large as the minimum weight unit is short of the target weight $W_o$, if the additive storage cups 4c and 4a and the subtractive storage cup 3b are selected, the articles of the minimum weight unit which are 9+1−3=7 times larger are added. Conversely, when the articles having a weight 7 times as large as the minimum weight unit are in excess of the target weight $W_o$, if the subtractive storage cups 3c and 3a and the additive storage cup 4b are selected, the articles of the minimum weight unit which are −9−1+3=−7 times larger are added, that is, the articles of the minimum weight unit which are 7 times larger are subtracted. Thus, in the present example, it is possible to adjust a weight within a range which is defined by multiplying the articles of the minimum weight unit by successive integers of −40 to 40, from the weight of the articles stored in the main storage cup 2.

Further, a filled container is replaced with an empty container at a step 38, and weighing is repeated from the step 33.

In the quantitative charging apparatus according to the present example 2, since the subtractive storage cups contain combinations of 1–40 minimum weight units, additive storage cups contain combinations of 1–40 minimum weight units, it is possible to adjust a weight within a larger range than in the example 1. Further, weighing is performed only once when the rough charging weight $W_a$ is calculated, and weighing while charging the articles is not performed. Hence, in the quantitative charging apparatus according to the present example as well, the filling speed is very high. In addition, the quantitative charging apparatus is advantageous in terms of cost since there is only one load cell, as in the example 1.

(Example 3)

Figure 5:
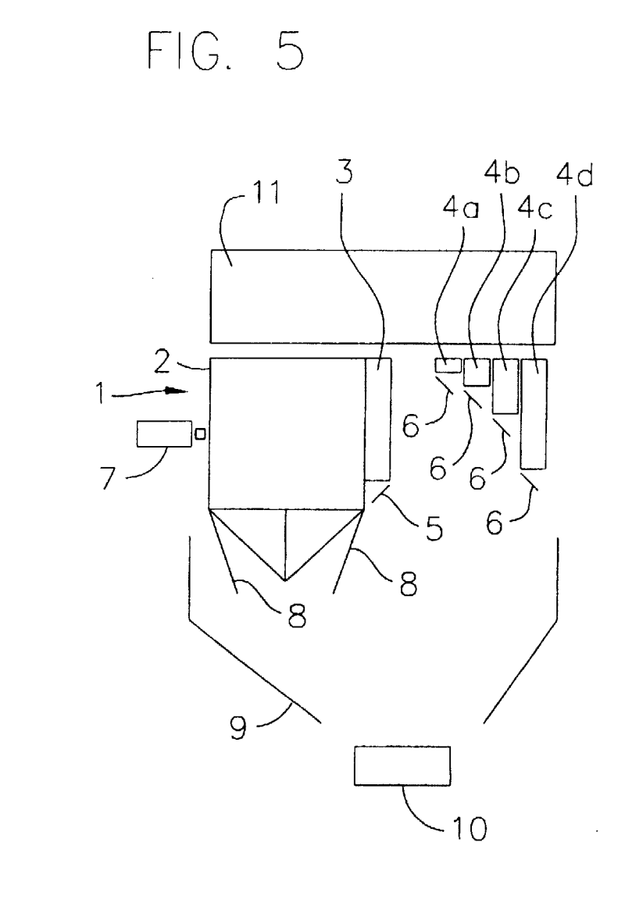
FIG. 5 is a schematic representation showing a third example of a quantitative charging apparatus according to the present invention.

FIG. 5 shows a schematic structure of a quantitative charging apparatus according to a third example of the present invention. The quantitative charging apparatus according to the present example has a similar structure to that of the quantitative charging apparatus of FIG. 1 described above, except that there is only one subtractive storage cup 3. Identical reference symbols are assigned to corresponding elements.

Figure 6:
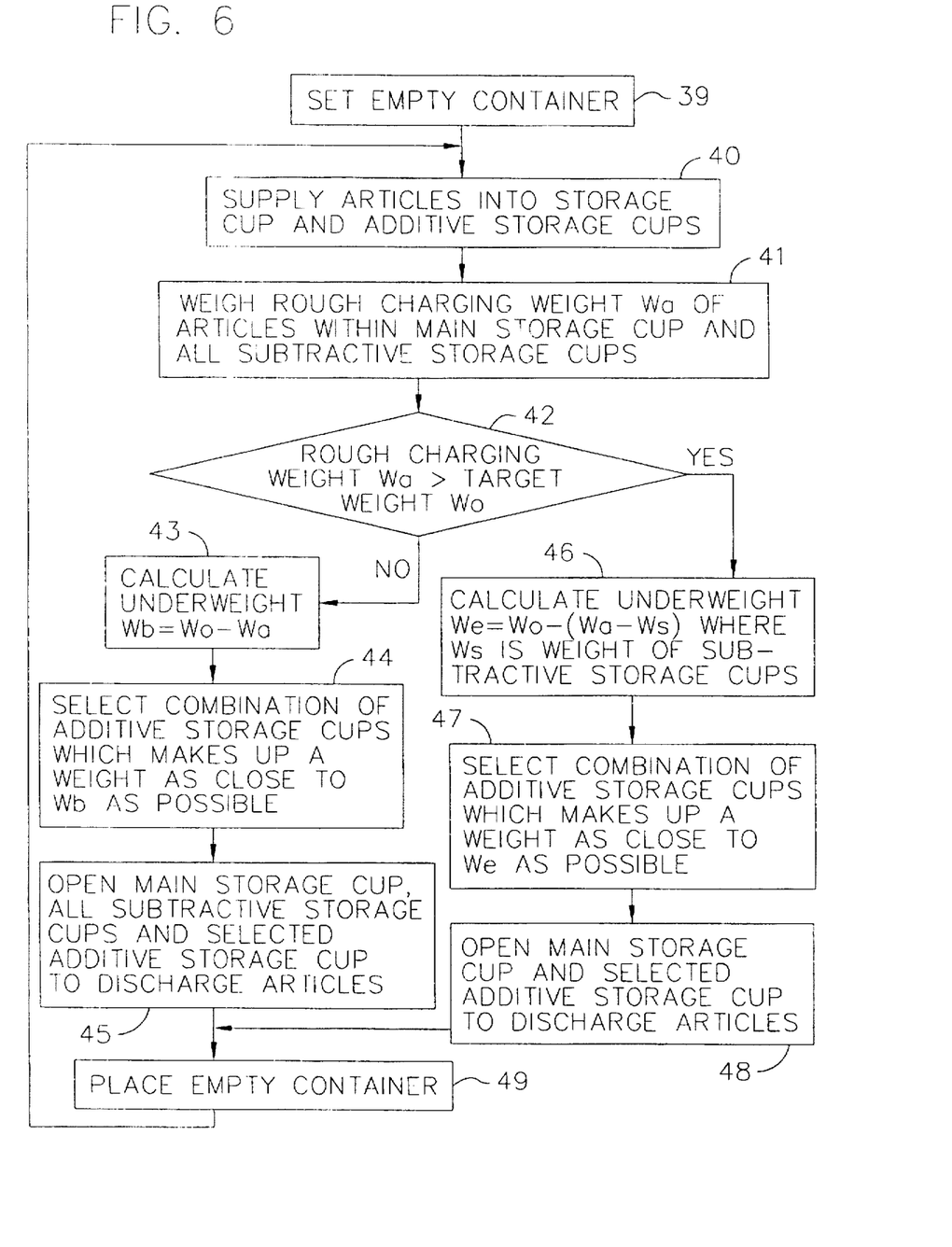
FIG. 6 is a flow chart showing the quantitative charging method which is performed by using the quantitative charging apparatus in FIG. 5.

Now, a quantitative charging method using the apparatus according to the present example will be described with reference to the flow chart in FIG. 6. The charging method of the present example 3 corresponds to the method of example 2 where the number of the subtractive storage cups is limited to 1. In short, both when the rough charging weight $W_a$ is larger than the target weight $W_o$ and when the rough charging weight $W_a$ is smaller than the target weight $W_o$, optimum charging is performed by finding an optimum combination of a subtractive storage cup 3 and the additive storage cups 4a to 4d.

First, the container 10 is set in a lower portion of the chute 9 at a step 39. At a step 40, articles are supplied from the charging apparatus 11 into the main storage cup 2 and the subtractive storage cup 3 of the storage cup 1, and into the four additive storage cups 4a to 4d. At a step 41, the total weight of the articles which are supplied into the storage cup 1, i.e., the main storage cup 2 and the subtractive storage cup 3, are weighed by the load cell 7, as the rough charging weight $W_a$. As in the example 1 and the example 2, the weights of articles supplied into the additive storage cups 4a to 4d are not weighed.

Next, at a step 42, the rough charging weight $W_a$ and the target weight $W_o$ are compared with each other. The following procedure is performed in accordance with a result of the comparison. First, when the rough charging weight $W_a$ is smaller than the target weight $W_o$, the underweight $W_b=W_o-W_a$ is calculated at Step 43. Next, at a step 44, a combination of the additive storage cups 4a to 4d is selected so that the combination becomes closest to the underweight $W_b$. Further, at a step 45, the articles within the selected additive storage cups are discharged together with the articles stored within the main storage cup 2 and the subtractive storage cup 3.

On the other hand, when the rough charging weight $W_a$ is larger than the target weight $W_o$, filling is performed without using the articles which are stored in the subtractive storage cup 3, as described below. First, an underweight $W_e=W_o-(W_a-W_s)$ is calculated. The symbol $W_s$ denotes the weight of the articles stored in the subtractive storage cup 3. Next, a combination of the additive storage cups 4a to 4d is selected so that the combination becomes closest to the underweight $W_e$. The weights of the articles stored within the subtractive storage cup 3 and the additive storage cups 4a to 4d can be calculated based on the bulk specific gravity of the articles as in the example 1 and the example 2. Since the capacity ratio between the additive storage cups 4a to 4d is 1:2:4:8 in this example, these additive storage can be combined to provide weights 1 to 15 times as large as the weights of the articles which are stored in the additive storage cup 4a.

Further, a filled container is replaced with an empty container at the step 49, and weighing is repeated from the step 40.

Since only one subtractive storage cup 3 is provided and weighing is performed only once when the rough charging weight $W_a$ is calculated in this example, quantitative charging can be performed at a high speed with a relatively simple structure. In addition, the present example is advantageous in terms of cost since there is only one load cell, as in the example 1 and the example 2.

While example 1 and example 2 have described systems where the numbers of additive storage cups and subtractive storage cups are each 4, the present invention is not limited to this. Rather, the numbers of these storage cups may be varied. Further, although the foregoing has described systems where the additive storage cups and the subtractive storage cups all have different capacities, some storage cups may have the same capacity. Extremely describing, it is allowable to dispose 100 storage cups which have the same capacity. In addition, although the positive integrs r and s are 2 or 3 in the examples above, the present invention is not limited to this. Rather, the numbers r and s may be other integers or decimal numbers.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A quantitative charging apparatus, comprising:

a storage cup which includes one main storage cup of a predetermined capacity and a plurality of subtractive storage cups each of a predetermined capacity so as to store articles having a weight which is close to a target weight $W_o$ within said main storage cup and said subtractive storage cups, each of the main storage cup and subtractive storage cups having a discharge gate;

a plurality of additive storage cups each of a predetermined capacity so as to store articles for adding, each of the additive storage cups having a discharge gate;

weighing means for weighing the total weight of articles which are supplied into said main storage cup and each of said subtractive storage cups as a rough charging weight $W_a$; and control means for comparing said target weight $W_o$ and said rough charging weight $W_a$, when said rough charging weight $W_a$ is smaller than said target weight $W_o$, said control means calculating an underweight $W_b=W_o-W_a$, selecting a combination of said additive storage cups based on the weight of articles stored in each of said additive storage cups which is calculated from a bulk specific gravity of the articles obtained from the total capacity of the main storage cups and all subtractive storage cups and said rough charging weight $W_a$ so that the combination becomes closest said underweight $W_b$, and thereafter discharging the articles stored within said additive storage cups which are selected together with the articles stored in said storage cup by opening the respective discharge gates, but when said rough charging weight $W_a$ is larger than said target weight $W_o$, said control means calculating an overweight $W_c = W_a - W_o$, selecting a combination of said subtractive storage cups based on the weight of articles stored in each of said subtractive storage cups which is calculated from said bulk specific gravity of the articles so that the combination becomes closest said overweight $W_c$, and thereafter discharging the articles stored within said subtractive storage cups which are not selected, by opening the respective discharge gates, together with the articles stored in said main storage cup.

2. The quantitative charging apparatus of claim 1, wherein some of said subtractive storage cups have the same capacity.

3. The quantitative charging apparatus of claim 1, wherein a capacity ratio between some of said subtractive storage cups is $$1:r^1:r^2: \ldots :r^{k-1}: \ldots :r^{n-1}$$

wherein: r is a positive real number, $0<k\leq n$, and $n\leq$ the number of said subtractive storage cups.

4. The quantitative charging apparatus of claim 3, wherein said positive real number r=2.

5. The quantitative charging apparatus of claim 3, wherein said positive real number r=3.

6. The quantitative charging apparatus of claim 1, wherein some of said additive storage cups have the same capacity.

7. The quantitative charging apparatus of claim 1, wherein a capacity ratio between some of said additive storage cups is $$1:s^1:s^2: \ldots :s^{k-1}: \ldots :s^{r-1}$$

wherein: s is a positive real number, $0<k\leq m$, and $m\leq$ the number of said additive storage cups.

8. The quantitative charging apparatus of claim 7, wherein said positive real number s=2.

9. The quantitative charging apparatus of claim 7, wherein said positive real number s=3.

10. A quantitative charging apparatus, comprising:

a storage cup which includes one main storage cup of a predetermined capacity and one or a plurality of subtractive storage cups each of a predetermined capacity so as to store articles having a weight which is close to a target weight $W_o$ within said main storage cup and said subtractive storage cups, each of the main storage cup and one or a plurality of subtractive storage cups having a discharge gate;

a plurality of additive storage cups each of a predetermined capacity so as to store articles for adding, each of the additive storage cups having a discharge gate;

weighing means for weighing the total weight of articles which are supplied into said main storage cup and each of said subtractive storage cups as a rough charging weight $W_a$; and control means for calculating a weight difference $W_d = W_a - W_o$ between said target weight $W_o$ and said rough charging weight $W_a$, selecting said subtractive storage cups to be subtracted from said weight difference $W_d$ and said additive storage cups to be added to said weight difference $W_d$ based on the weight of articles stored in each of said subtractive storage cups and said additive storage cups which is calculated from a bulk specific gravity of the articles obtained from the total capacity of the main storage cups and all subtractive storage cups and said rough charging weight $W_a$ so that the combination becomes closest said weight difference $W_d$, and thereafter discharging the articles stored within said subtractive storage cups which are not selected and the articles stored within said additive storage cups which are selected, by opening the respective discharge gates, together with the articles stored in said main storage cup.

11. The quantitative charging apparatus of claim 10, wherein some of said subtractive storage cups have the same capacity.

12. The quantitative charging apparatus of claim 10, wherein a capacity ratio between some of said subtractive storage cups is $$1:r^1:r^2: \ldots :r^{k-1}: \ldots :r^{n-1}$$

wherein: r is a positive real number, $0<k\leq n$, and $n\leq$ the number of said subtractive storage cups.

13. The quantitative charging apparatus of claim 12, wherein said positive real number r=2.

14. The quantitative charging apparatus of claim 12, wherein said positive real number r=3.

15. The quantitative charging apparatus of claim 10, wherein at least some of said additive storage cups have the same capacity.

16. The quantitative charging apparatus of claim 10, wherein a capacity ratio between at least some of said additive storage cups is $$1:s^1:s^2: \ldots :s^{k-1}: \ldots :s^{r-1}$$

wherein: s is a positive real number, $0<k\leq m$, and $m\leq$ the number of said additive storage cups.

17. The quantitative charging apparatus of claim 16, wherein said positive real number s=2.

18. The quantitative charging apparatus of claim 16, wherein said positive real number s=3.

19. Apparatus for delivering quantities of product with each quantity being of an acceptable weight relative to a target weight Wo, said apparatus comprising:

a main storage cup and one or more subtractive storage cups, said main storage cup and said one or more subtractive storage cups having combined capacities sufficient to hold a quantity of product having a rough charging weight Wa close to said target weight, each subtractive storage cup having a predetermined capacity and each being adapted to hold a predetermined weight of product calculated as a function of said predetermined capacity and a bulk specific gravity of the product obtained from the total capacity of the main storage cup and all subtractive storage cups and said rough charging weight Wa, each of the main storage cup and one or more subtractive storage cups having a discharge gate;

a plurality of additive storage cups, each having a predetermined capacity and each being adapted to hold a predetermined weight of product calculated as a function of the predetermined capacity of the storage cup and said bulk specific gravity of the product, each of the additive storage cups having a discharge gate;

a weigher for determining the rough charging weight Wa of product in said main storage cup and said one or more subtractive storage cups;

a control system for comparing said target weight Wo and said rough charging weight Wa;

said control system being operable if the rough charging weight Wa is less than said target weight Wo to (1) calculate an underweight Wb=Wo−Wa, (2) select a combination of one or more additive storage cups holding a combined product weight close to said underweight Wb, and (3) unload the product stored in the main storage cup, said one or more subtractive storage cups and said one or more additive storage cups of the selected combination, by opening the respective discharge gates to effect a delivery of product of acceptable weight; and said control system being operable if the rough charging weight Wa is greater than said target weight Wo to (1) calculate an overweight Wc=Wa−Wo, (2) select a combination of one or more subtractive storage cups holding a combined product weight close to said overweight Wc, and (3) unload the product stored in the main storage cup and any subtractive storage cup or cups not included in the selected combination, by opening the respective discharge gates to effect a delivery of product of acceptable weight.

20. Apparatus for delivering quantities of product with each quantity being of an acceptable weight relative to a target weight Wo, said apparatus comprising a main storage cup and one or more subtractive storage cups, said main storage cup and said one or more subtractive storage cups having combined capacities sufficient to hold a quantity of product having a rough charging weight Wa close to said target weight, each subtractive storage cup having a predetermined capacity and each being adapted to hold a predetermined weight of product calculated as a function of said predetermined capacity and a bulk specific gravity of the product obtained from the total capacity of the main storage cup and all subtractive storage cups and said rough charging weight Wa, each of the main storage cup and one or more subtractive storage cups having a discharge gate;

a plurality of additive storage cups, each having a predetermined capacity and each being adapted to hold a predetermined weight of product calculated as a function of the predetermined capacity of the storage cup and said bulk specific gravity of the product, each of the additive storage cups having a discharge gate;

a weigher for determining the rough charging weight Wa of product in said main storage cup and said one or more subtractive storage cups;

a control system for calculating a weight difference Wd=Wa−Wo between the target weight Wo and said rough charging weight Wa, for selecting a combination of one or more subtractive storage cups having weights to be subtracted from said weight difference Wd and/or one or more additive storage cups having weights to be added to said weight difference Wd so that the combination has a weight close to said weight difference Wd, and for unloading the product stored in the main storage cup, in any additive storage cup or cups of the selected combination, and in any subtractive storage cup or cups not included in the selected combination, by opening the respective discharge gates, to effect a delivery of product of acceptable weight.

21. A method of delivering quantities of product with each quantity being of an acceptable weight relative to a target weight Wo, said method utilizing a main storage cup, one or more subtractive storage cups, and a plurality of additive storage cups, each of said subtractive and additive storage cups having a predetermined capacity, said product having a bulk specific gravity, said method comprising loading the main storage cup, filling the one or more subtractive storage cups and the additive storage cups, weighing the product in the main storage cup and in the one or more subtractive storage cups to determine a rough charging weight of product in the main storage cup and the one or more subtractive storage cups;

determining the weight of product in each of the subtractive and additive storage cups by using the bulk specific gravity of the product and the predetermined capacity of the storage cup;

comparing said target weight Wo and said rough charging weight Wa;

if the rough charging weight Wa is less than the target weight Wo, calculating an underweight Wb=Wo−Wa, selecting a combination of one or more additive storage cups holding a combined product weight close to said underweight Wb, and unloading the product stored in the main storage cup and said one or more additive storage cups of the selected combination to effect a delivery of product of acceptable weight; and if the rough charging weight Wa is greater than said target weight Wo, calculating an overweight Wc=Wa−Wo, selecting a combination of one or more subtractive storage cups holding a combined product weight close to said overweight Wc, and unloading the product stored in the main storage cup and any subtractive storage cup or cups not included in the selected combination to effect a delivery of product of acceptable height.

22. A method of delivering quantities of product with each quantity being of an acceptable weight relative to a target weight Wo, said method utilizing a main storage cup, one or more subtractive storage cups, and a plurality of additive storage cups, each of said subtractive and additive storage cups having a predetermined capacity, said product having a bulk specific gravity, said method comprising loading the main storage cup, filling the one or more subtractive storage cups and the additive storage cups, weighing the product in the main storage cup and the one or more subtractive storage cups to determine a rough charging weight of product in the main storage cup and the one or more subtractive storage cups;

determining the weight of product in each of the subtractive and additive storage cups by using the bulk specific gravity of the product and the predetermined capacity of the storage cup;

comparing said target weight Wo and said rough charging weight Wa;

calculating a weight difference Wd=Wa−Wo between the target weight Wo and said rough charging weight Wa;

selecting a combination of one or more subtractive storage cups having weights to be subtracted from said weight difference Wd and/or one or more additive storage cups having weights to be added to said weight difference Wd so that the combination has a weight close to said weight difference Wd; and unloading the product stored in the main storage cup, in any additive storage cup or cups of the selected combination, and in any subtractive storage cup or cups not included in the selected combination, to effect a delivery of product of acceptable weight.

* * * * *